United States Patent [19]
Epner et al.

[11] 3,865,394
[45] Feb. 11, 1975

[54] SHEET METAL STEERING KNUCKLE WITH INTEGRAL STEERING ARM

[75] Inventors: Elliot J. Epner, Huron; Oscar G. Kitchin; Peter M. Sampatacos, both of Port Clinton, all of Ohio

[73] Assignee: General Motors Corporation, Detroit, Mich.

[22] Filed: June 11, 1973

[21] Appl. No.: 368,708

[52] U.S. Cl. ............................................. 280/96.1
[51] Int. Cl. ............................................. B62d 7/18
[58] Field of Search ............ 280/96.1, 96.2 R, 95 R, 280/96.3, 124 A; 188/18 R, 18 A

[56] References Cited
UNITED STATES PATENTS

| | | | |
|---|---|---|---|
| 2,295,913 | 9/1942 | Phelps | 280/96.1 |
| 2,311,125 | 2/1943 | Phelps | 280/96.1 |
| 2,435,814 | 2/1948 | Allison | 280/96.1 |
| 2,449,306 | 9/1948 | Leighton | 280/96.1 |
| 2,580,383 | 1/1952 | Frank | 280/96.1 |
| 2,611,625 | 9/1952 | Kishline et al. | 280/96.2 R |
| 2,635,894 | 4/1953 | Jackman | 280/96.2 R |
| 3,147,026 | 9/1964 | Schilberg | 280/96.2 R |
| 3,749,415 | 7/1973 | Sampatacos | 280/96.1 |

Primary Examiner—Kenneth H. Betts
Attorney, Agent, or Firm—F. J. Fodale

[57] ABSTRACT

A sheet metal steering knuckle has a continuous side wall bent in such a fashion to provide structure for pivotally mounting the steering knuckle on a steer axis and structure for an integral steering arm for pivoting the steering knuckle about the steer axis. Additionally the steering knuckle includes a stepped portion providing a mounting pad for a disc brake caliper.

3 Claims, 7 Drawing Figures

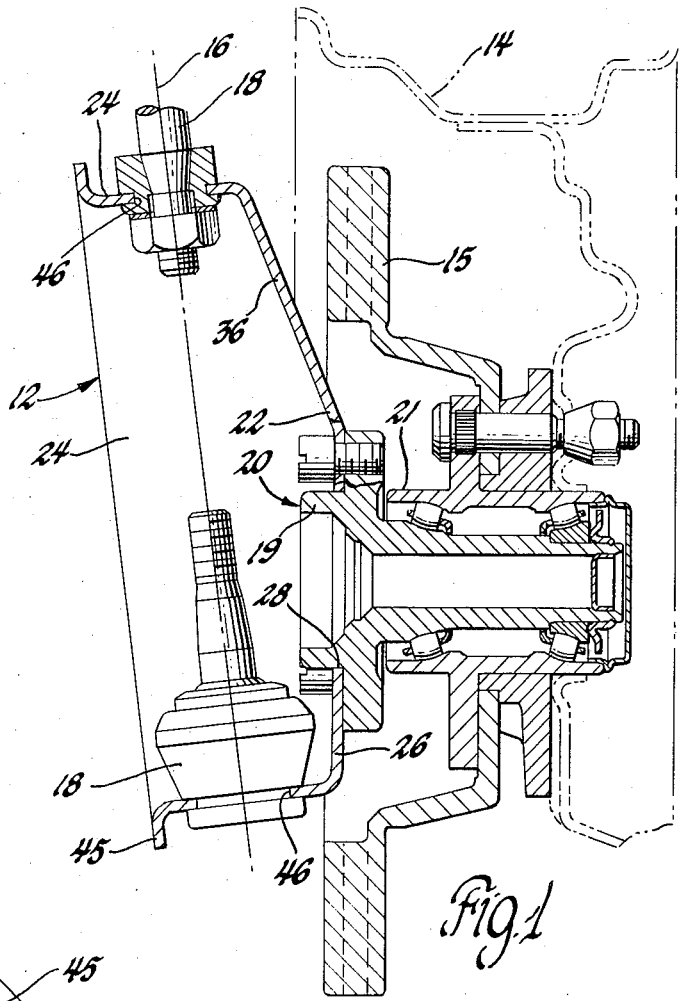

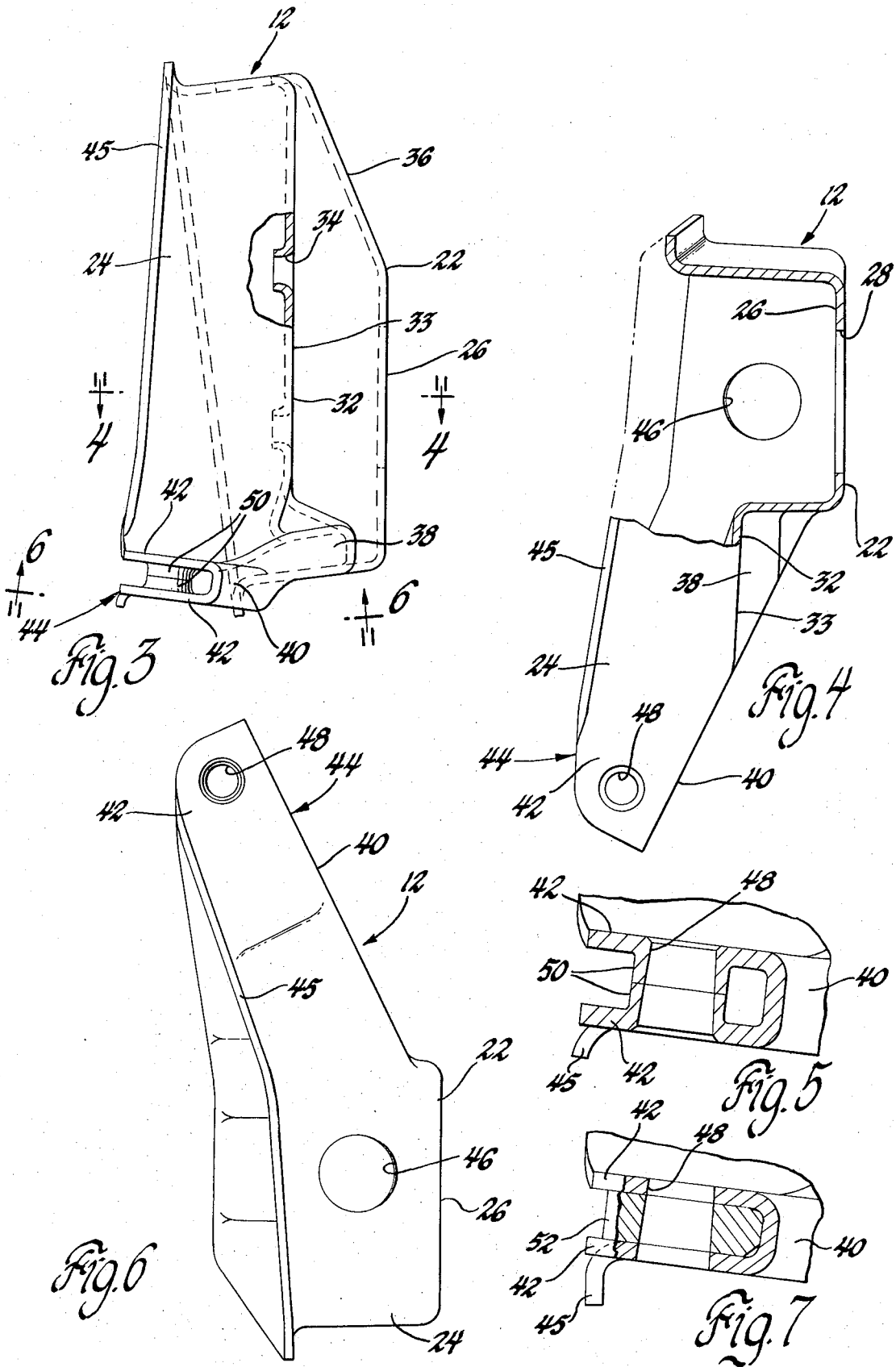

SHEET METAL STEERING KNUCKLE WITH INTEGRAL STEERING ARM

This invention relates generally to steering knuckles and more particularly to a steering knuckle with an integral steering arm.

Present practice is to construct steering knuckles with integral steering arms of heavy castings to provide the required strength and rigidity to withstand vehicle loads and the steering forces imposed on the steering knuckle in use. The cost of such steering knuckles is quite high as the castings require machining to within close tolerance limits for attachment to various parts of the suspension system and the steering linkage system. In addition such steering knuckles impose still higher costs as the other components of the suspension and steering system must be designed to withstand the heavier weight of a casting.

In the past, various attempts have been made to reduce the cost of steering knuckles by fabricating them from sheet metal thereby effecting a cost savings not only in the steering knuckle, per se, but in the entire suspension and steering linkage systems due to the lighter weight of the steering knuckle element. However, so far as we are aware, all of the prior attempts at constructing steering knuckles of sheet metal have sacrificed the integral arm feature of the casting with the result that an extra part, that is, the steering arm, must be separately fabricated and attached to the steering knuckle in some fashion. See for instance the U.S. Pat. Nos. to Layton 2,449,306; Phelps 2,311,125; Allison 2,435,814; Jackman 2,635,894 and the U.S. Pat. application Ser. No. 154,814 filed June 21, 1971, now U.S. Pat. No. 3,749,415, for a "Steering Knuckle Assembly" and assigned to the assignee of the present invention.

An important object of this invention then is to provide a sheet metal steering knuckle with an integral steering arm thereby realizing the attendant advantages in weight and cost savings over the cast type steering knuckle and at the same time avoiding the disadvantages associated with fabricating a separate steering arm and attaching it to the steering knuckle.

Since it is now customary to equip the front wheels of an automobile with disc brakes, another object of this invention is to provide a unitary, sheet metal steering knuckle which not only incorporates an integral steering arm in the sheet metal steering knuckle but also incorporates a mounting pad for the caliper assembly of a disc brake.

Another important object of this invention is to provide a sheet metal steering knuckle characterized by a substantially continuous side wall bent in such a fashion so as to substantially duplicate a closed box structure thereby adding torsional rigidity to the entire steering knuckle while at the same time providing structure for pivotally mounting the steering knuckle on a steer axis and an integral steering arm for pivoting the steering knuckle about the steer axis.

Other objects and advantages of the invention will hereinafter become more fully apparent from the following description of the annexed drawing, which illustrates a preferred embodiment, and wherein:

FIG. 1 is a front section view through a portion of a motor vehicle suspension for a steerable wheel provided with a sheet metal steering knuckle in accordance with my invention.

FIG. 2 is a side view of the steering knuckle, per se.

FIG. 3 is a front view of the sheet metal steering knuckle shown in section in FIG. 1 and shown alone in FIG. 2.

FIG. 4 is a section of the sheet metal steering knuckle taken along the line 4—4 of FIG. 3.

FIG. 5 is a section of the integral steering arm of the sheet metal steering knuckle taken along the line 5—5 of FIG. 2.

FIG. 6 is a bottom view of the sheet metal steering knuckle taken along the line 6—6 of FIG. 3.

FIG. 7 is a section similar to FIG. 5 showing an alternate construction for the steering arm portion of the sheet metal steering knuckle.

Referring now to the drawing and more particularly to FIG. 1, a sheet metal steering knuckle 12 supports a steerable wheel 14 independently suspended on a pair of spaced control arms (not shown) which pivotally mount the steering knuckle 12 on a steer axis 16 through the upper and lower ball joints 18.

The steering knuckle 12 carries the stationary axle 19 of a unit handled anti-friction bearing assembly generally indicated at 20. The wheel 14 together with a brake disc 15 in turn is carried by the rotatable outer spindle 21 of the bearing assembly 20.

From the several figures of the drawing, it can be seen that the sheet metal steering knuckle 12 is a generally cup-shaped member and gives the impression of a somewhat trapezoidal cup with a handle extending from the larger of the parallel sides of the trapezoid.

Referring in particular to FIGS. 1 and 2, the generally cup-shaped sheet metal steering knuckle 12 may be divided for description purposes into a bottom wall 22 and a side wall 24 which is bent upright from the bottom wall 22 and almost completely surround it.

The bottom wall 22 includes a flat portion 26 having a large opening 28 which receives the stud end of the stationary axle 19 of the bearing assembly 20. The flat portion 26 of the bottom wall 22 also includes an array of bolt holes 30 around the large opening 28 by which the bearing assembly 20 is bolted to the steering knuckle 12.

The bottom wall 22 further includes a stepped portion raised toward the open end of the steering knuckle 12 which provides a flat shelf 32 parallel to the flat portion 26. See FIG. 3. The flat shelf 32 has two holes 34 extruded toward the open end of the steering knuckle and as such comprises a mounting pad 33 for a disc brake caliper (not shown). The mounting pad 33 thus provided in a laterally spaced relationship to the flat portion 26 offers the advantage that the brake disc 15 may be aligned with the flat portion 26 of the steering knuckle as shown in FIG. 1 resulting in a compact assembly.

In the particular steering knuckle disclosed, the bottom wall portion 36 extending from the top of the flat portion 26 to the portion of side wall 24 at the top of the steering knuckle is angled away from the flat portion 26 toward the open end of the steering knuckle to clear the brake disc 15. The bottom wall 36 further includes a trough portion 38 which at its inner end connects the flat portion 26, a portion of the side wall 24 and the shelf 32. The outer end of the trough portion 38 comprises a constant curvature bight 40 which is angled away from the flat portion 26 of the bottom wall 22 and forms part of the integral steering arm indicated generally at 44 as will hereafter more fully appear.

The side wall 24 comprises substantially flat parallel end portions 42 which are closely spaced by the bight 40. See FIGS. 2, 3 and 5. These closely spaced end portions 42 and the bight 40 form a strong rigid steering arm 44 integral with the steering knuckle 12 for pivoting the steering knuckle 12 about the steer axis 16 (indicated in FIG. 1). The side wall 24 is continuous between the end portion 42 and almost completely surrounds the steering knuckle 12 except for the opening between the parallel end portions 42 forming part of the steering arm 44. Since this opening is so small in relationship to the height and width of the steering knuckle 12, the steering knuckle 12 is substantially as rigid as if the side wall were a completely closed box structure. For further increasing the strength of the sheet metal steering knuckle, the free end of the side wall 24 has an outturned flange 45 along its entire edge except at the end portions 42 where the flange would interfere with connection to the steering linkage (not shown). Although the side wall 24 is described as continuous, this of course contemplates that the side wall 24 is not imperforate as the side wall 24 has coaxial holes 46 for mounting the steering knuckle 12 to control arms which in this particular instance is accomplished by the ball joints 18.

If desired, the side wall 24 can be completely closed. For instance, the bore 48 in the steering arm 44 for connecting it to a steering linkage may be formed by extruding depending circular flanges 50 in the side wall end portions 42 which are in mutual abutting engagement as shown in FIG. 5. Alternatively a spacer element 52 could be welded into the space between the end portions 42 as shown in FIG. 7.

We wish it to be understood that we do not desire to be limited to the exact details of construction shown and described, for obvious modifications will occur to a person skilled in the art.

We claim:

1. A steering knuckle having an integral steering arm comprising
   a unitary sheet metal, generally cup-shaped member having a bottom wall with a flat portion adapted for mounting a wheel spindle thereon, a stepped portion having a flat shelf spaced from and substantially parallel to said flat portion adapted for mounting a disc brake caliper thereon, and a side wall having a pair of coaxial holes for connecting said steering knuckle to a pair of control arms for pivotal movement about a steer axis,
   said side wall further having substantially flat, parallel, closely spaced end portions connected by a bight continuous with said bottom wall forming a steering arm for pivoting the steering knuckle about the steer axis, and
   said side wall being continuous and having a continuous outturned flange between said end portions and connected to said bottom wall along substantially the entire periphery of the bottom wall.

2. The steering knuckle as defined in claim 1 wherein said end portions have depending circular flanges in mutual abutting engagement for strengthening said steering arm and wherein said steering arm is provided with a bore extending therethrough bounded in part by said depending circular flanges for connecting said steering arm to a steering linkage.

3. The steering knuckle as defined in claim 1 further comprising a spacer disposed between said end portions and secured thereto, and a bore extending through said end portions and said spacer for connecting said steering knuckle to a steering linkage.

* * * * *